United States Patent
Barrows

[11] 3,748,896
[45] July 31, 1973

[54] VIBRATOR UNIT FOR TESTING A MOTOR VEHICLE FOR RATTLES AND SQUEAKS

[75] Inventor: Robert E. Barrows, Utica, N.Y.

[73] Assignee: Chicago Pneumatic Tool Company, New York, N.Y.

[22] Filed: Jan. 20, 1972

[21] Appl. No.: 219,418

[52] U.S. Cl. .................................. 73/71.5, 92/226
[51] Int. Cl. ............................................ G01n 29/00
[58] Field of Search ..................... 92/226, 227, 229; 73/71.5, 71.6, 471, 472, 473, 474

[56] References Cited
UNITED STATES PATENTS

| | | | |
|---|---|---|---|
| 3,010,439 | 11/1961 | Mee et al. | 91/226 |
| 1,848,844 | 3/1932 | Salmonson | 91/226 |
| 2,551,289 | 5/1951 | Quinlan | 73/71.5 |
| 3,078,720 | 2/1963 | Hofmann | 73/457 |
| 3,675,471 | 7/1972 | Bouche | 73/67 |
| 3,106,653 | 10/1963 | Fowler | 73/71.6 X |
| 2,642,848 | 6/1953 | Walraven et al. | 91/226 |

Primary Examiner—Richard C. Queisser
Assistant Examiner—Arthur E. Korkosz
Attorney—Stephen J. Rudy

[57] ABSTRACT

A vibrator unit for detecting rattles and squeaks in selected parts of a motor vehicle; the detector having a cylinder in which a piston is pneumatically reciprocable to develop vibrations in the cylinder. An adjustable clamp is mounted upon the cylinder for detachably clamping the cylinder to a selected part of a motor vehicle so as to transmit the vibrations of the cylinder to the part and general area. A live air supply hose line having a pressure regulator therein is connected to an inlet of the cylinder; the regulator being manually operable to selectively vary the pressure of operating air flow to the cylinder and as a consequence varying the operating frequency of the piston; and the hose line being lengthy so as to permit operation of the regulator at distances remote from the cylinder. A noise muffler is connected by a hose line to an exhaust port of the cylinder to obtain a quiet environment for better discerning sounds of rattles and squeaks.

4 Claims, 3 Drawing Figures

VIBRATOR UNIT FOR TESTING A MOTOR VEHICLE FOR RATTLES AND SQUEAKS

BACKGROUND OF THE INVENTION

This invention relates to vibrators. It is especially concerned with a vibrator unit for use in causing vibrations of an object to which it is mounted, the vibrations being caused by a pneumatically reciprocable piston.

While the invention may be subject to various applications, it is especially designed for use in testing selected parts of a motor vehicle for rattles and squeaks relative to their mountings.

A driver of a motor vehicle in riding over a rough road may hear rattles and squeaks coming from different areas of the vehicle, some of which are noticeable when the vehicle is moving slowly and being mildly shaken, and other of which become noticeable only when the vehicle is moving rapidly and being violently shaken. The source of some of the rattles and squeaks may be readily apparent and, accordingly, easily corrected by a mechanic. But the source of many others may only be suspected. These latter are not readily locatable while the vehicle is moving; and there is considerably more difficulty in locating their source when the vehicle is at rest in a mechanic's garage.

Accordingly, the objective of this invention is to provide an efficient vibratory means for inducing vibrations into a vehicle while it is at rest to determine sources of rattles and squeaks.

In accordance with the invention, there is provided a vibrator unit for causing vibration of an object to determine if it rattles or squeaks relative to its mounting, comprising a vibrator, means carried by the vibrator for detachably clamping the vibrator to a selected object, means for pneumatically operating the vibrator, and means for selectively varying its vibrating frequency. The vibrations are induced by means of a pneumatically reciprocable piston within a chamber of the vibrator.

An advantageous feature of the device of the present invention lies in a control member which is carried by, and is automatically actuable by the piston to control the application of operating air alternately to opposite ends of the piston.

Vibration is induced by alternately accelerating the piston from self induced air cushions developed at opposite ends of the piston chamber.

The desired vibrating characteristics are derived from the fact that the piston stroke of this device is basically fixed, thus enabling a wider range of frequencies and more power throughout the range than would be available with other designs where the stroke reduces with frequency.

Another advantageous feature is provided by the clamping means which is carried along the underside of the vibrator and is manually adjustable for attaching the vibrator to various parts of a motor vehicle.

A further advantageous feature lies in the nature of the means for varying the vibrating frequency of the vibrator. This is a manipulative pressure regulator arranged in the operating air supply hose line, and is operable at a selectable distance from the vibrator as determined by the length of the hose line.

Another desirable feature is provided by means of a muffler connected to the exhaust port of the vibrator whereby the usual noise accompanying air exhausting to atmosphere is materially reduced and a quiet environment is thus provided to better detect the sources of rattles and squeaks during operation of the device.

These various features and the advantages flowing therefrom, as well as others, will become apparent as the description of the device is further detailed herein.

DESCRIPTION OF A PREFERRED EMBODIMENT

Figure 1:
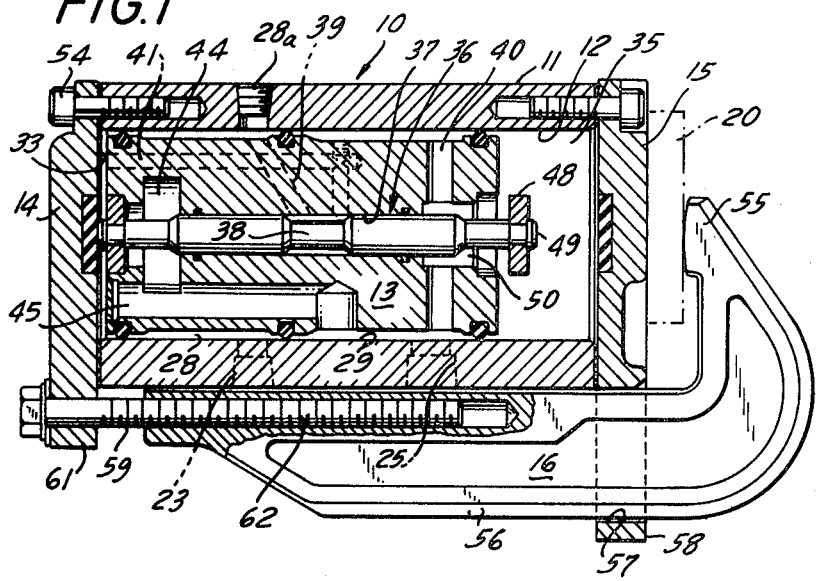
FIG. 1 is a sectional view taken on line 1—1 of FIG. 3.
Figure 3:
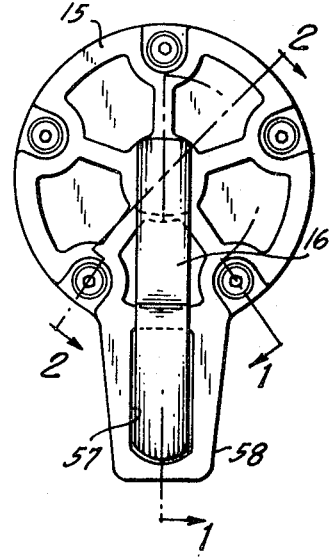
FIG. 3 is a view of the right end of FIG. 1.

The vibrator unit illustrating the invention in the accompanying drawing includes a vibrator 10 having a cylinder 11 defining a piston chamber 12 in which a piston 13 is pneumatically reciprocable between opposite end walls 14 and 15 of the cylinder. A clamp 16 mounted upon the cylinder is adapted to secure the vibrator to an object 20 to be tested for squeaks and rattles, such as a frame member or other component of a motor vehicle. The action of the reciprocating piston will be transmitted to the vehicle causing the latter to vibrate in frequency with the action of the piston. As the vehicle is vibrated, any rattling or squeaking noise that might be heard will be noted; and the cause may then be subsequently corrected by the mechanic.

The operating frequency of the piston may be varied as desired by the mechanic by means of a manually operable pressure regulator 17 controlling the flow of the operating air to the cylinder. Varying the operating frequency of the piston may be required to cause rattling or squeaking in an object to surface.

The regulator 17 is of conventional design. It is connected in an operating air supply line which includes a first section 18 of hose connecting a source of pressure air to an inlet 19 of the regulator; and includes a second section 21 of hose connecting an outlet 22 of the regulator to an inlet port 23 of the cylinder 11. The mechanic may control the operating frequency of the vibrator by turning a control knob 24 of the regulator, as needed, to vary the pressure of operating air flow to the cylinder.

Air spent in reciprocating the piston is exhausted from the cylinder through a port 25 to a hose line 26 connected to a suitable noise muffler 27. The latter eliminates undesirable noise that might otherwise accompany the exhausting air. In this manner, the mechanic may more easily hear and detect any rattling and squeaking sounds that may arise in the object being tested.

A variable frequency control during the testing operation is desired so as to detect different rattles. To this end, the supply hose line sections 18 and 21 are of adequate length to enable the mechanic to explore any outside area or sit in the vehicle itself with the regulator 24 and control the vibration frequency of the unit, thus enabling the mechanic to better detect undesirable sounds in the vehicle being vibrated.

The inlet port 23 to the cylinder communicates at all times with an annular chamber 28 defined between the cylinder wall and a groove about the rear portion of the piston. The exhaust port 25 communicates at all times with an annular chamber 29 defined between the cylinder wall and a groove about the forward portion of the piston. Chambers 28 and 29 are sealed from one another by means of an O-ring 31. The inlet chamber 28 is sealed by an O-ring 32 from an expansible chamber 33 rearwardly of the piston; and the exhaust chamber 29 is sealed by an O-ring 34 from an expansible chamber 35 at the opposite end of the piston cylinder.

The body of the piston is ported for conducting inlet air alternately to chambers 33 and 35 at opposite ends of the piston to effect reciprocation of the latter, and for communicating chambers 33 and 35 alternately with the exhaust port 25.

A valve unit or porting control member 36 carried for sliding movement in an axial bore 37 of the piston is shiftable from one position to an opposite position as a consequence of reciprocating action of the piston. It serves to direct the flow of operating air to, and the exhaust of spent air from, the end chambers 33 and 35.

The porting control member 36 includes a control shaft 30 slidable in the piston bore 37. The shaft has a neck 38, the area about which is at all times in communication with a port 39 connecting through the side of the piston with the inlet chamber 28. A port 41 serves to communicate the neck area with chamber 33 at the rear of the piston; and a similar port 42 serves to communicate the neck area with the opposite chamber 35. The neck area is registrable to feed inlet air with one or the other of ports 41 and 42, accordingly, as shaft 30 is shifted relative to the piston; one of the ports being blocked from the neck area when the other is in registry therewith.

A valve controlled port 43 at the rear end of the piston connects through an annulus 44 and a port 45 with the exhaust chamber 29. A valve controlled port 50 at the front end of the piston connects through radial ports 40 with the exhaust chamber 29. A disc valve 46 fixed by means of a button head 47 to one end of shaft 30 controls opening and closing of port 43, accordingly as the shaft is shifted relative to the piston; and a second disc valve 48 similarly fixed by means of a button head 49 to the opposite end of the shaft similarly controls opening and closing of port 50. As the shaft is shifted in one direction, valve 46 is moved into an annular recess to seat upon an annular shoulder to close port 43 from chamber 33; and the opposite valve 48 is moved out of a similar recess from a shoulder to open port 50 to chamber 35. The reverse occurs as the shaft is shifted in the opposite direction.

Each button head 47, 49 projects a little beyond its related valve; and also projects a little beyond the related end of the piston when the valve is seated in the piston. One of the button heads bumps against the related end wall of the piston cylinder as the piston is driven in one direction; and the other button head similarly bumps against the opposite end wall of the cylinder as the piston returns in the opposite direction.

So that the end walls 14, 15 of the cylinder will not generate noise by the repeated bumping of the button heads, a rubber disc 53 is seated in a recess in each end wall to receive the impacts of the related button head.

Further, each end wall of the cylinder is removably bolted, as at 54, over an open end of the cylinder. This is of advantage in that it permits the piston, together with the porting control member 36, to be readily removed through either end of the cylinder for purposes of repair or replacement.

The clamp 16, by means of which the vibrator is attachable to an object to be tested for possible rattles and squeaks, includes a clamping jaw 55. The jaw is axially movable relative to an outer end face of the piston cylinder to effect a clamped condition upon an object 20 placed between them. The jaw is formed at the forward end of a leg portion 56 which is slidably supported in an opening 57 of a lug 58 depending from the forward end wall of the cylinder. The opening 57 and leg 56 present flat side bearing surfaces to one another whereby the jaw is guided in its movement and is prevented from relative turning upon its axis. An adjustable drive screw 59, for operating the clamp, is slidably supported in a depending lobe 61 of the rear cylinder wall, and is threadedly engaged in a longitudinal bore 62 of the clamp leg. The clamp jaw is caused to be drawn into, or released from, clamping condition, accordingly as the screw 59 is turned in one direction or the other.

Figure 2:
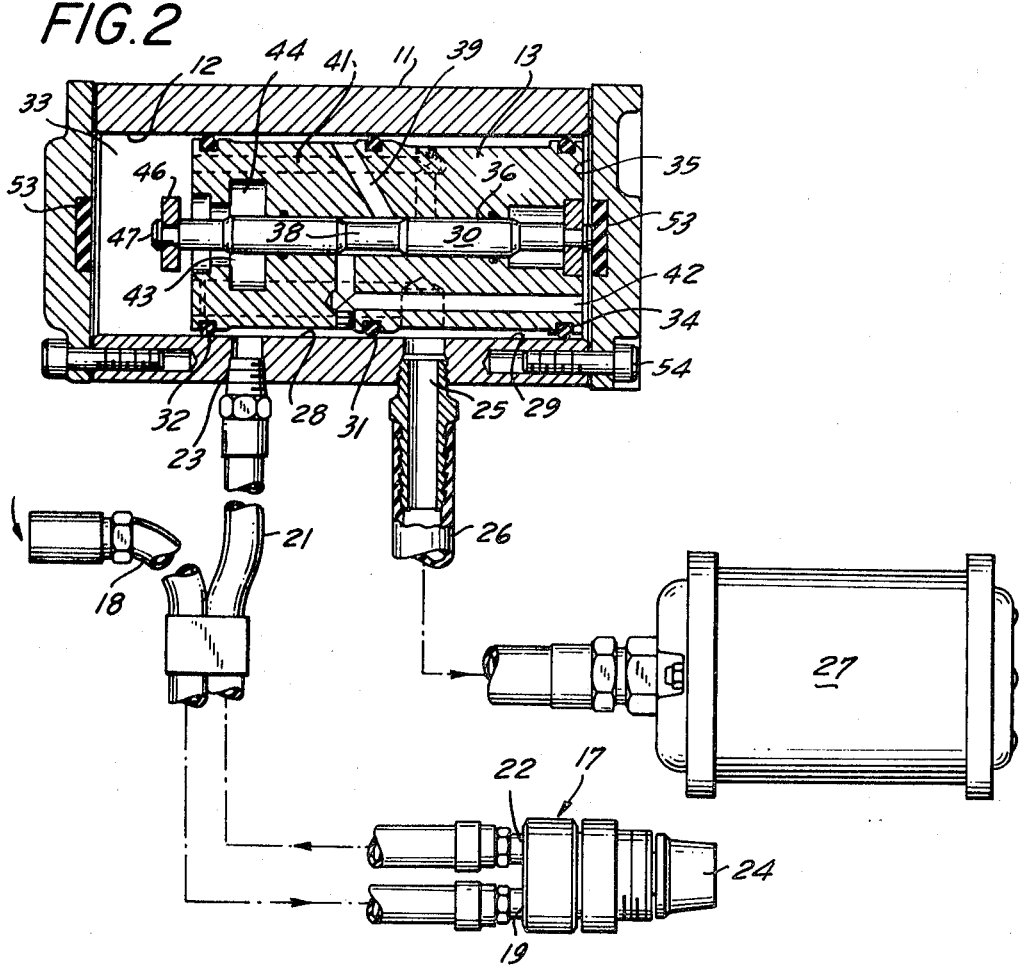
FIG. 2 is a sectional view taken on line 2—2 of FIG. 3.

In summary of the operation of the vibrator unit: The unit is caused to be clamped to a part of a vehicle in a general area that is suspected of rattling or squeaking upon being vibrated. The regulator knob 24 is then turned to cause a selected regulated flow of pressure air over the supply line to the inlet chamber 28 of the cylinder. Assuming the piston 13 has obtained the position shown in FIG. 1, air entering chamber 28 passes through port 39, around neck area 38, and port 41 to chamber 33 at the rear end of the piston to drive the piston and the control member 36 forwardly to bump the forward button head 49 against the front end wall 15. As the button head strikes the latter, the control shaft 30 is shifted inwardly of the piston, as in FIG. 2, to close valve 48 over port 50, and to open the opposite valve 46 to exhaust the spent air from chamber 33 through ports 43 and 45 to the exhaust chamber 29. The shifted body of shaft 30 now blocks port 41 from the neck area 38, and registers the latter with port 42 leading to the forward chamber 35 of the cylinder. Accordingly, inlet air now flows from the inlet chamber 28 around the neck area 38 and through port 42 to the front end of the piston in chamber 35 to drive the piston and the control member 36 rearwardly to bump the rear button head 47 against the rear cylinder wall 14. This shifts the control shaft 30, as in FIG. 1, so as to now seat the rear disc valve 46 and close the rear chamber 33 to exhaust, and to unseat the front disc valve 48 to open the forward chamber 35 to exhaust. The shifted body of the control shaft now communicates the air from the inlet chamber 28 around the neck area 38 with the rear chamber 33 to again drive the piston forwardly. The piston, accordingly, reciprocates to vibrate the cylinder and the object 20 to which the cylinder is clamped, and the general area of which object 20 is part of. Reciprocation of the piston continues automatically until the control knob 24 of the pressure regulator is turned to shut off inlet air flow.

If the selected frequency at which the piston is caused to reciprocate is inadequate to cause the suspected part to rattle or squeak, the control knob 24 may be turned to increase or reduce the pressure of the inlet air flow as needed.

The suspected part may be caused to vibrate at various frequencies until rattling is noted, or until it is determined that the rattling sound and squeaks are not present in the particular part being tested.

It is preferable when testing delicate parts of a vehicle for rattles and squeaks that testing be made at low frequencies.

A pipe plugged port 28a is provided for oiling of the tool.

I claim:

1. A vibrator unit adapted for testing rattles and squeaks in a motor vehicle, comprising a housing, a pneumatically reciprocable piston means in the housing for developing vibrations therein, an adjustable clamp on the housing for detachably mounting the housing to an area of the vehicle suspected of causing rattles and squeaks, an operating air pressure regulator connected with an inlet port to the housing for effecting reciprocation of the piston at selectable frequencies, and a noise muffler connected with an exhaust port of the housing.

2. A vibrator unit as in claim 1, wherein the regulator has a hose line connection with the inlet port, the hose line being sufficient in length to allow location of the regulator at selectable distances from the housing.

3. A vibrator unit as in claim 1, wherein the noise muffler has a hose line connection with the exhaust port.

4. A vibrator unit as in claim 1, wherein the regulator is manually adjustable.

* * * * *